Dec. 25, 1962 FRANKLIN C. CHIANG 3,070,305

SERIAL DELAY LINE ADDER

Filed May 22, 1958 8 Sheets-Sheet 1

INVENTOR.
FRANKLIN C CHIANG
BY John B. Clark
ATTORNEY

Dec. 25, 1962

FRANKLIN C. CHIANG 3,070,305

SERIAL DELAY LINE ADDER

Filed May 22, 1958

8 Sheets-Sheet 2

Dec. 25, 1962 FRANKLIN C. CHIANG 3,070,305

SERIAL DELAY LINE ADDER

Filed May 22, 1958 8 Sheets-Sheet 3

Dec. 25, 1962 FRANKLIN C. CHIANG 3,070,305

SERIAL DELAY LINE ADDER

Filed May 22, 1958 8 Sheets-Sheet 4

Dec. 25, 1962

FRANKLIN C. CHIANG 3,070,305

SERIAL DELAY LINE ADDER

Filed May 22, 1958

8 Sheets-Sheet 6

Dec. 25, 1962 FRANKLIN C. CHIANG 3,070,305

SERIAL DELAY LINE ADDER

Filed May 22, 1958 8 Sheets-Sheet 8

United States Patent Office 3,070,305
Patented Dec. 25, 1962

3,070,305

SERIAL DELAY LINE ADDER

Franklin C. Chiang, Palo Alto, Calif., assignor to International Business Machines Corporation, New York, N.Y., a corporation of New York Filed May 22, 1958, Ser. No. 737,043
41 Claims. (Cl. 235—176)

This application is a continuation-in-part of the application Serial No. 690,359, now abandoned, filed on October 15, 1957. The invention disclosed herein pertains generally to arithmetic circuits and relates more particularly to circuits for adding and subtracting.

A feature of the present invention is directed to an adder wherein numbers to be added are represented by intervals of time, these intervals being summed to determine the sum of the numbers. The augend and addend are used to determine the electrical length of delay lines or other suitable means, and the total delay afforded by the lines corresponds to the sum of the numbers.

Thus, one object of the present invention is to provide a new and improved adder.

Another object is to provide an adder arranged to determine the sum of two numbers according to the sum of intervals of time representative of the two numbers.

A further object is to provide an adder wherein the sum of the numbers to be added is determined according to the electrical length of delay lines representative of the numbers.

Another feature of the invention is directed to the circuitry for recognizing the degree of delay afforded by the augend and addend delay lines. To this end, means are provided for comparing sum signals taken from the addend line with signals occurring at selected time intervals corresponding to the various possible sums.

Another object, therefore, is to provide a novel circuit for identifying the degree of delay afforded by delay lines.

Still another object is to determine the sum of two numbers by comparing a signal delayed according to the sum with signals occurring at predetermined time intervals for determining the sum.

Still another feature of the invention is directed to the recognition of and provision for carries generated by the summation of numbers and according to this feature means are provided for generating carry signals in response to a sum exceeding the radix of the number system being used. These signals are arranged to control the summation of an additional unit of delay into the next higher order as well as into still higher orders where a carry to a given order effects a carry to the next higher order.

Another object, therefore, is to provide an adder wherein a carry resulting from the addition of two numbers controls the provision of a unit of delay into the circuitry for determining the sum of the next higher order.

A still further object is to provide an adder having means for detecting carry signals and arranged to determine carries which result from carry signals when said carry signals are detected.

According to the invention variable length delay lines are provided for representing the augend and addend, one such line being provided for all orders of the augend and a separate line being provided for each order of the addend. Control circuitry is provided for determining the electrical length of these lines according to the augend and addend, the augend line being arranged to provide several electrical lengths simultaneously according to the various orders thereof and each order of the addend lines being arranged to provide electrical lengths according to the corresponding orders. Signals are applied to the augend line and are taken therefrom at time intervals corresponding to the various orders to the augend for entry into the corresponding addend lines. These signals, when taken from the addend line, are delayed an amount determined by the sum of the individual orders and are then analyzed for determining carries and the corresponding corrections to the individual sums. These corrections are made and the total delay for each order is then determined for indicating the sum of the numbers entered into the lines.

Thus, another object is to provide an adder utilizing variable length delay lines for representing numbers to be added.

A still further object is to provide an adder wherein the various orders of the augend and addend are added in parallel according to the delay of the signals entered into various delay lines of lengths representative of the augend and addend.

Still another object is to provide an adder having a tapped delay line adapted for representing the value of various orders of an augend according to selected taps.

A further feature of the present invention is directed to circuitry utilizing the delay techniques set forth above for performing subtraction. In this case the minuend and subtrahend determine the electrical lengths of delay lines or the like and the delay afforded by these lines corresponds to the difference. In the disclosed embodiment subtraction is accomplished by performing complement addition, the minuend being added to the complement of the subtrahend. Thus, one delay line is arranged to provide the delay corresponding to the minuend, a second delay line providing a delay corresponding to the complement of the subtrahend, and the sum of the delays afforded by the minuend and subtrahend delay lines is indicative of the difference of these numbers.

Thus, a further object of the invention is to provide a novel subtracting circuit.

Still another object is to provide a circuit for determining the difference of two numbers according to the sum of delay intervals corresponding to the numbers.

According to this feature of the invention, the minuend and subtrahend delay lines are settable according to the minuend and the complement of the subtrahend, respectively, the output of one of these lines being connected to the input of the other, and the time delay of the signal entered into one line and taken from the other is analyzed for interpreting the total delay to determine the difference. In addition, and prior to interpretation of the delay for identifying the difference, an analysis is made to provide for various delay corrections necessitated for various reasons such as the case where a borrow is taken during the subtraction of a lower order or where the sum exceeds the radix of the number system being used, and it is the corrected delay that is interpreted to identify the difference of a given order. To this end, delayed signals corresponding to a given order are analyzed together with information such as that regarding borrows taken during the subtraction of the next lower order for varying the delay accordingly, after which time the corrected delay is interpreted.

Thus, another object is to provide a circuit for subtracting according to the sum of delay intervals representative of numbers wherein provisions are made for altering the resultant delay according to necessary corrections prior to an analysis of the delay for determining the difference.

Other objects of the invention will be pointed out in the following description and claims and illustrated in the accompanying drawings which disclose, by way of example, the principle of the invention and the best mode which has been contemplated of applying that principle.

In the drawings:

FIGS. 1*a*, 1*b* and 1*c*, when disposed adjacent each other, comprise a schematic diagram of an embodiment of the adder of the invention.

Figure 4A:
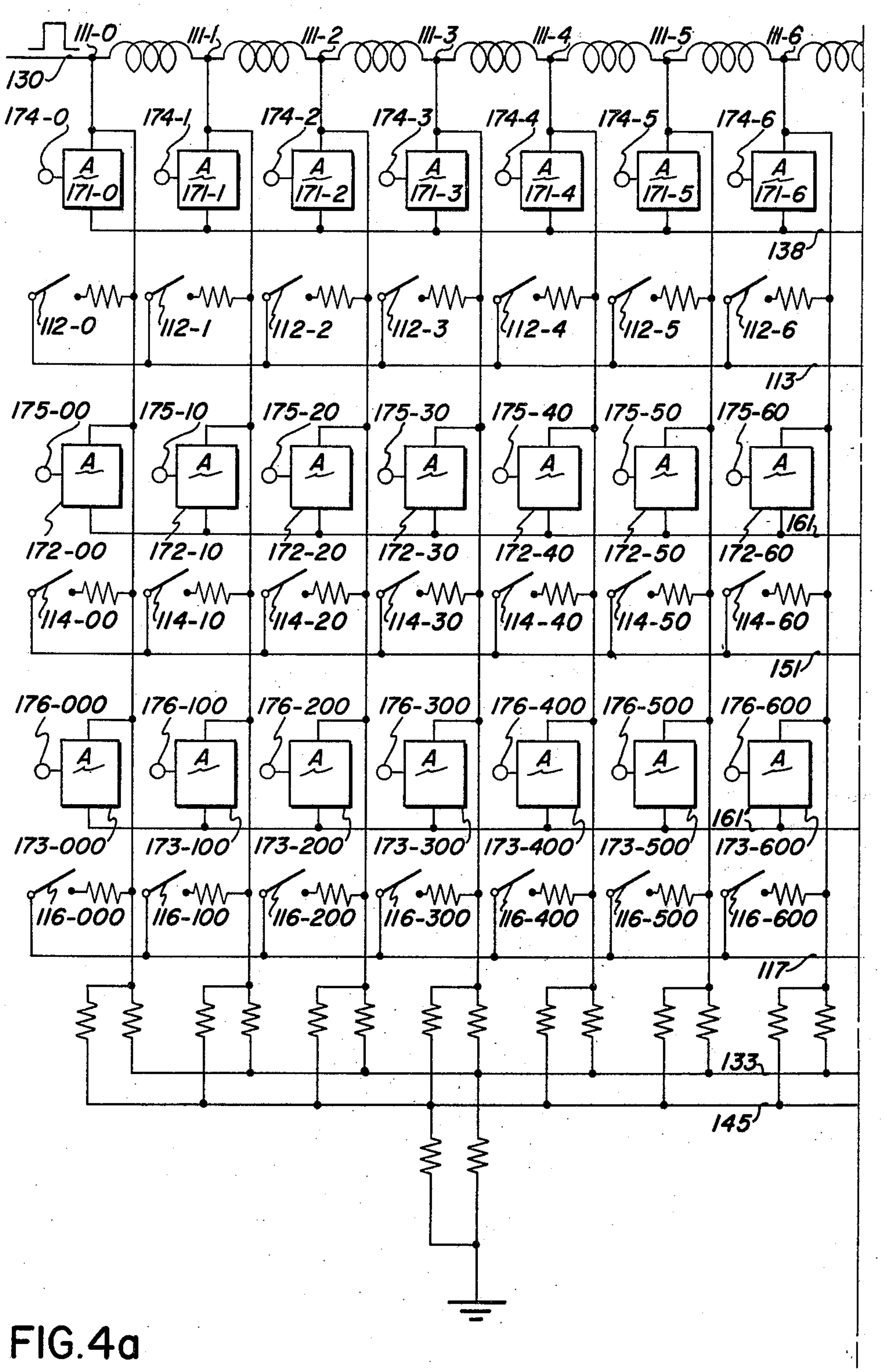
Figure 4B:
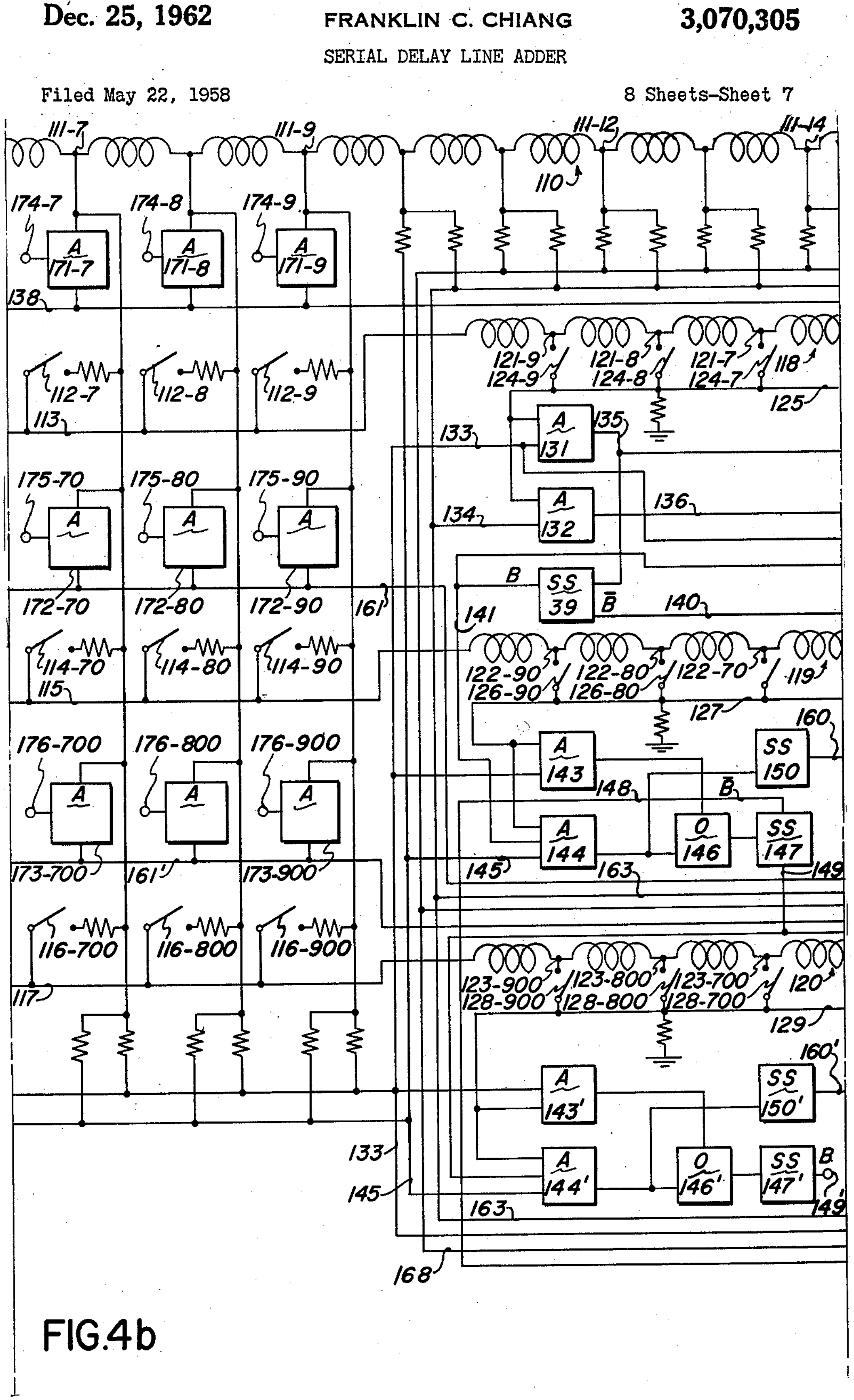
Figure 4C:
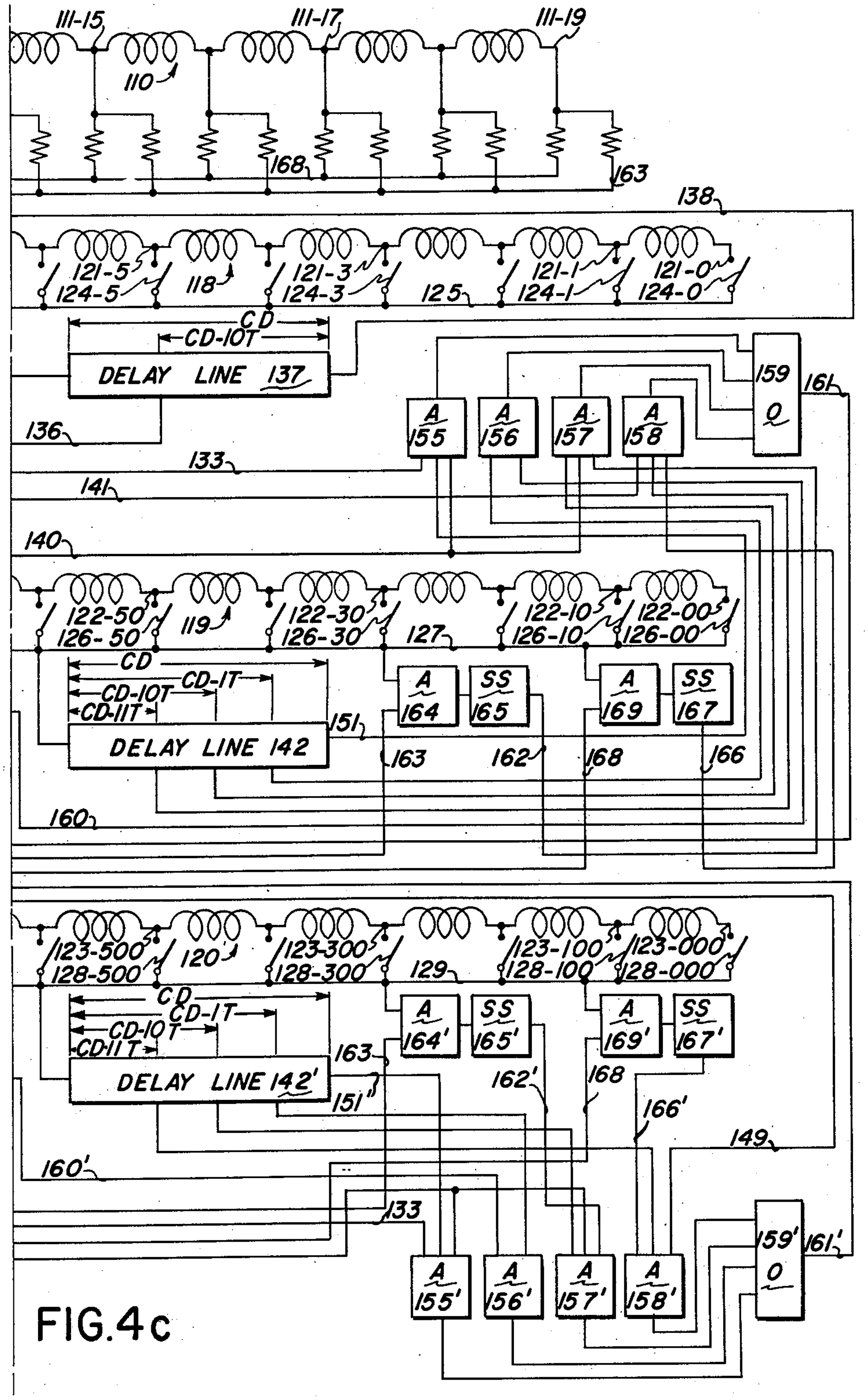

FIGS. 4*a*, 4*b* and 4*c*, when disposed adjacent each other, comprise a schematic diagram of an embodiment of the subtracter of the invention.

Figure 2:
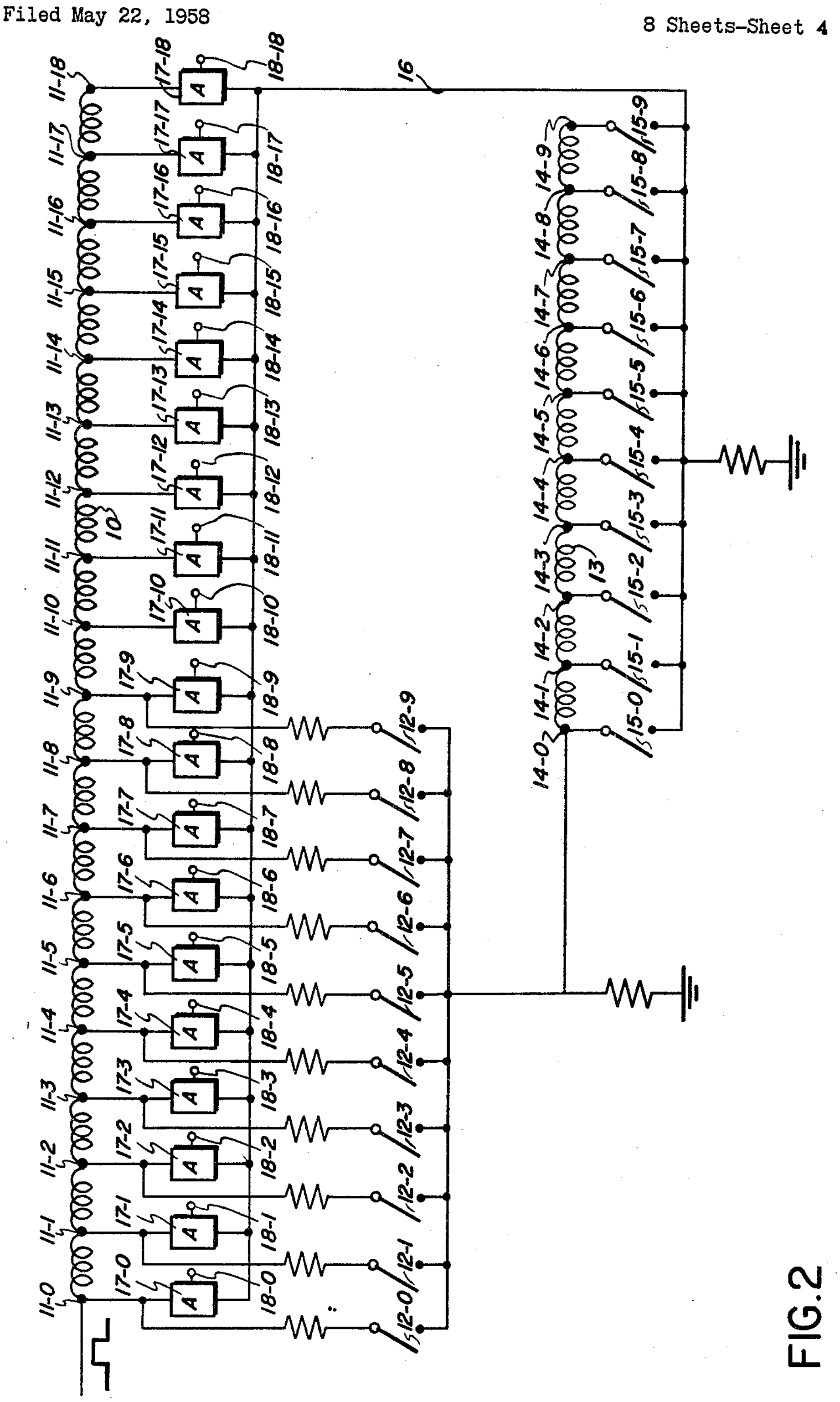
FIG. 2 is a schematic diagram of a single order adder which illustrates the basic mode of operation of the adder of the invention.

A basic understanding of the invention is best obtained by first referring to the single order adder circuit shown in FIG. 2. In FIG. 2 there is shown a delay line 10 having nineteen equally spaced taps 11—0 through 11—18 provided therealong. Each of the taps 11—0 through 11—9 connects through a corresponding switch 12—0 through 12—9 to the input of a second delay line 13. The line 13 is also tapped, as at 14—0 through 14—9, to provide a number of equal delay sections, each of which is equal to the delay sections between adjacent taps of the line 10. Connected to each of the taps 14 is one side of a corresponding switch 15, the other sides of these switches being connected to a common conductor 16.

Each of the taps 11 of the delay line 10 connects to one input of a corresponding two-input "and" unit 17, the second input to each of these units being connected to the conductor 16. The output taps of the "and" units 17, labeled 18—0 to 18—18 inclusive, are arranged to indicate the sum of the numbers being added, as will be explained.

Numbers to be added are entered into the appropriate switches 12 and 15, the augend being entered in the switch 12—0 through 12—9 corresponding thereto and the addend being entered into the proper switch 15—0 through 15—9. Thereafter the delay line 10 is pulsed, this pulse being arranged to travel along the line 10 to each of the various taps 11 as well as through the operated switch 12 to the delay line 13. From the input to the line 13, this pulse travels therealong to the tap associated with the operated switch 15, through this switch and through the conductor 16 to each of the "and" units 17. When entered onto the conductor 16, this pulse has been delayed an amount corresponding to the sum of the delays determined by the condition of the switches 12 and 15, at which time the pulse traveling along the line 10 is at a tap 11 which corresponds to this sum. Thus, there is a coincidence of pulses on only one of the "and" units 17, according to the sum of the delays determined by the augend and addend, and only one output tap 18, indicative of the sum of the augend and addend, is pulsed.

In operation, assume that it is desired to add 7 to 9. A 9 is entered into the augend switches 12 by operating switch 12—9, the 7 being entered into the addend switches 15 by operating the switch 15—7. Next, the delay line 10 is pulsed, this pulse being arranged to travel the length thereof as well as to pass through the switch 12—9, through a portion of the delay line 13 to the switch 15—7, through this switch, and via the conductor 16 to one side of each of the "and" units 17. This pulse is entered on the conductor 16 after having been delayed by 9 units of delay in the line 10 and 7 units of delay in the line 13, or a total of 16 units of delay. At this time the pulse traveling along the line 10 is at tap 11—16 thereof, and there is a coincidence of pulses on the "and" unit 17—16. This permits a pulse to pass through this, and only this, "and" unit, thereby entering a signal on the output tap 18—16 for indicating that the sum of the augend and addend, i.e., 9+7, equals 16.

Thus, numbers are added by the summation of delays representative of the numbers and by then determining this summation. The circuitry shown in FIG. 2, although not suited for addition of multi-order numbers, illustrates the principle of operation of the more complex multi-order circuitry shown in FIG. 1.

Figure 1A:
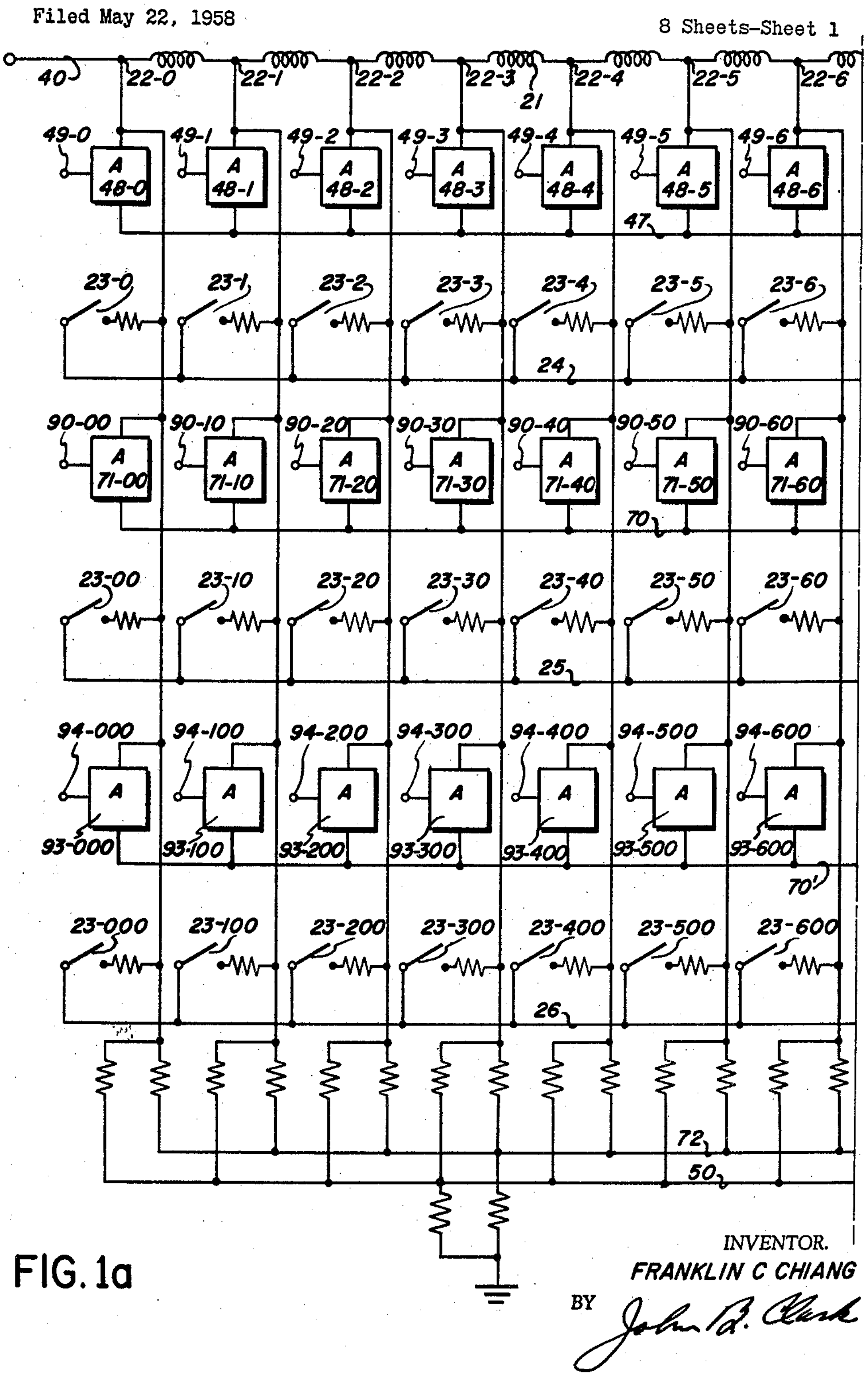
Figure 1B:
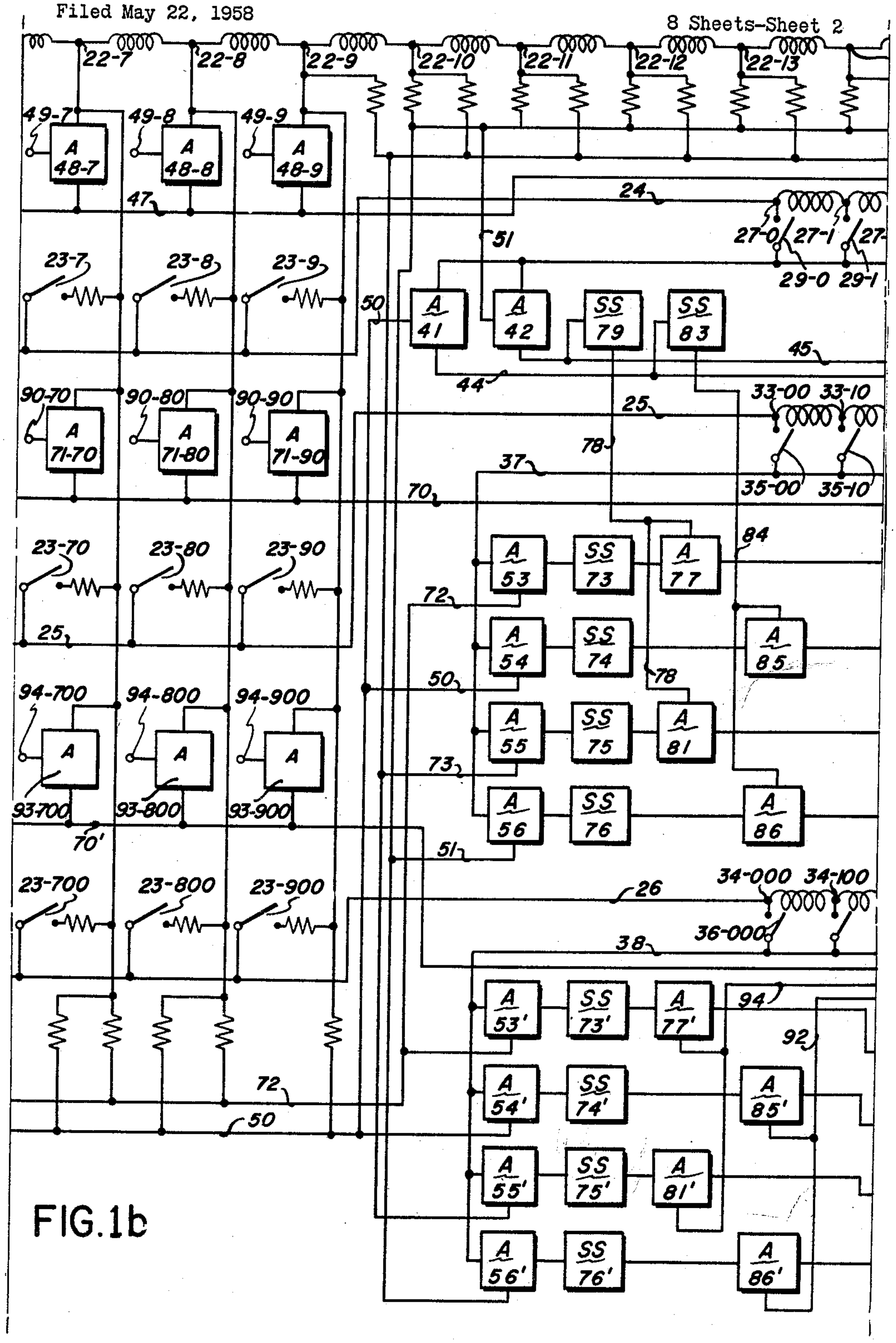
Figure 1C:
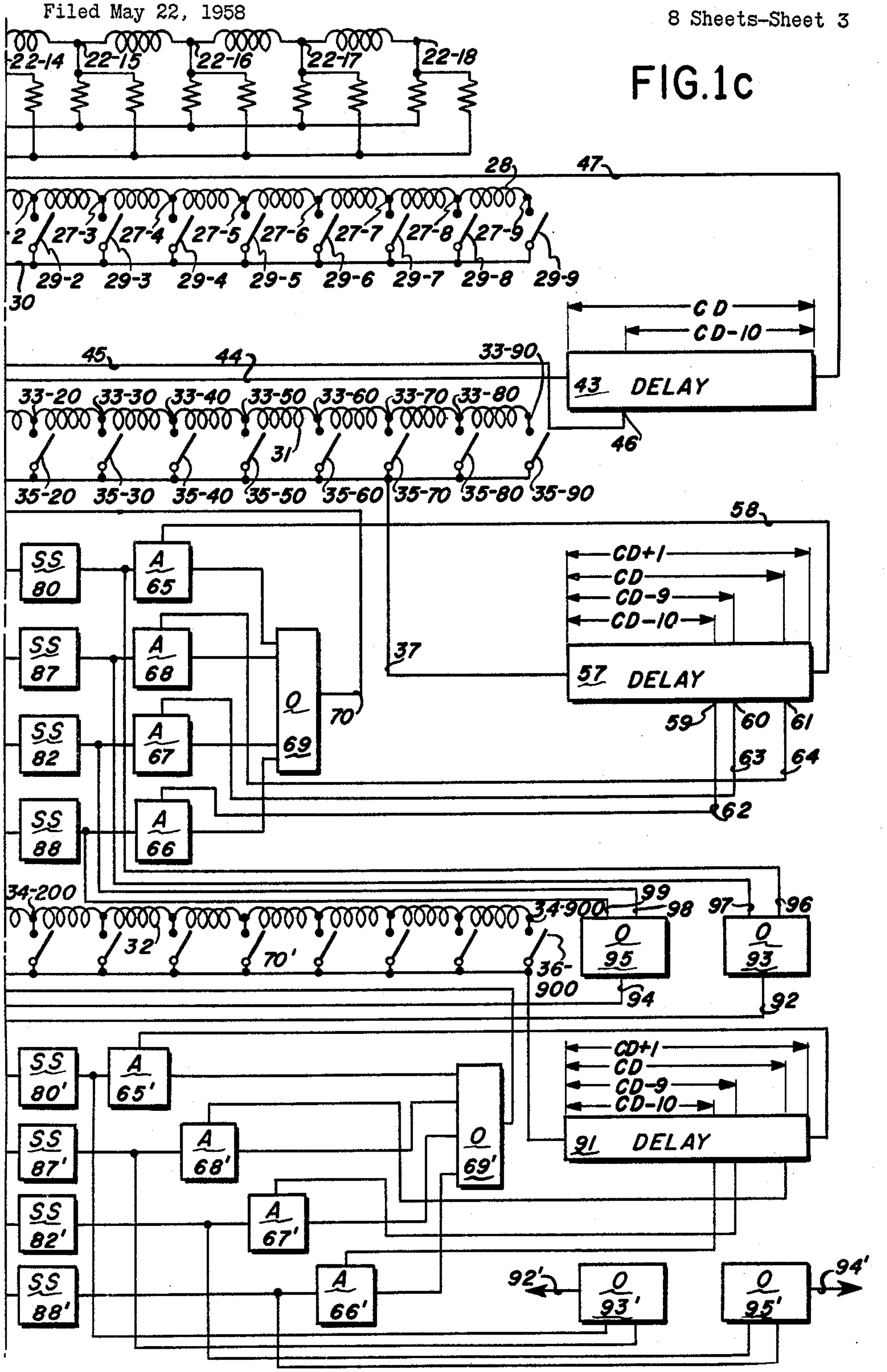

Referring now to FIGS. 1*a*, 1*b* and 1*c*, the multi-order adder of the invention comprises an augend delay line 21 having nineteen equally spaced taps 22. These taps divide the line 21 for providing eighteen equal units of delay *t*, and are numbered 0 through 18. The various taps 22—0 through 22—9 connect through corresponding switches 23 to each of three conductors 24, 25 and 26. The switches 23, like the taps 22, are numbered as shown in the drawing and are referred to as switches 23—0, 23—00, 23—000, 23—1, etc. Thus, tap 22—3 of the line 21 connects through the switch 23—3 to the conductor 24 as well as through the switch 23—30 to the conductor 25 and the switch 23—300 to the conductor 26.

The switches 23 are shown as conventional, mechanically operated switches; however, it will be understood that any convenient method of accomplishing the desired function may be employed and, when used in connection with high-speed computing systems or the like, electronic switching, many suitable forms of which will be obvious to those skilled in the art, may certainly be employed. In any event, these switches are provided for entering the augend into the adder circuitry, the switches 23—0 through 23—9 being provided for indicating the units order of the augend, the switches 23—00 through 23—90 being arranged to indicate the tens order of the augend, and the switches 23—000 through 23—900 being arranged to indicate the hundreds order of the augend. To simplify an understanding of the invention, the adder has been shown as operative to add numbers containing only three orders; however, by the provision of additional switches 23 as well as additional addend delay lines (to be described) in accordance with the present teaching, the number of orders may be expanded to that desired.

As noted in the drawing, one side of each of the switches 23—0 through 23—9 connects through a suitable isolating resistor to the corresponding tap 22—0 to 22—9 inclusive, the other sides of these switches being connected to the conductor 24. In a similar manner, the switches 23—00 through 23—90 and 23—000 to 23—900 inclusive connect the corresponding taps 22—0 through 22—9 to the conductors 25 and 26. The conductor 24 connects to the 0 tap 27 of a units order addend delay line 28. The line 28 is provided with ten equally spaced taps 27—0 through 27—9 to provide nine equal units of delay, each of which is equal to *t*, the unit of delay between adjacent taps of the augend line 21. Each tap 27 connects through a corresponding switch 29 to a conductor 30, thereby connecting signals taken from the conductor 24 through a portion of the line 28 to the conductor 30 according to the condition of the switches 29. The switches 29 are operated under control of the units order of the addend and if, for example, the units order of the addend is 3, the switch 29—3 connects the tap 27—3 to the conductor 30 for delaying signals entered on the conductor 24 by 3*t* prior to their entry on the conductor 30.

Signals entered through switches 23 on the conductors 25 and 26 are arranged to drive tens and hundreds order addend delay lines 31 and 32, respectively, the conductor 25 being connected to the 00 tap 33 of the line 31 and the conductor 26 being connected to the 000 tap 34 of the line 32. Each of the taps 33—00 through 33—90 of the delay line 31 connects through a corresponding switch 35—00 through 35—90 to a conductor 37, each of the taps 34—000 through 34—900 being connected through corresponding switches 36—000 to 36—900 inclusive to a conductor 38.

As mentioned earlier herein, addition is accomplished by adding delays corresponding to the augend and addend. To this end, the units order augend digit is entered into the corresponding switch 23—0 through 23—9, tens and hundreds augend digits being entered into switches 23—00 through 23—90 and 23—000 through 23—900, respectovely. The units order addend digit is entered into the switches 29—0 through 29—9 according to the identity of that digit. The tens and hundreds order addend digits are likewise entered into the switches 35—00 through 35—90 and 36—000 through 36—900, respectively.

After the augend and adend have been entered, the add operation is initiated by the provision of a so-called "add" pulse via a conductor 40 into the augend delay line 21. It was mentioned that the taps 22—0 through 22—18 of the line 21 are spaced equally and that it takes a time $t$ for an add pulse to travel between adjacent taps. Thus, when the add pulse is applied to the tap 22—0 it takes a time $18t$ for this pulse to reach the tap 22—18. An add pulse initiates a cycle of operation and, according to the present invention, the addition operation is completed during two cycles, the second cycles being initiated by a second add pulse. A cycle is equal to a convenient period of time, and in the present embodiment it is assumed that each cycle is equal to $30t$. As will become apparent, the initial step in the summation of two numbers is accomplished during the first 18 periods $t$; however, an additional period of $12t$ has been provided to permit the necessary carries and resulting corrections to the initial sum to be made prior to the second cycle.

During the first cycle of operation the add pulse taken from the conductor 40 is entered into the delay line 21, which pulse is entered onto the conductors 24, 25 and 26 after delays corresponding to the various orders of the augend. Thus, the add pulse is entered onto the conductor 24 at a time which corresponds to the units order augend digit. This pulse is then entered into the units order addend delay line 28 and is taken therefrom via the conductor 30 after a delay corresponding to the sum of the units order augend and addend digits. For example, if the units order augend digit were 3, the switch 23—3 would be operated and if the units order addend digit were 6, the switch 29—6 would be operated. In this example the add pulse applied to the augend delay line 21 would appear on the conductor 24 after delay of $3t$ from where it is taken and entered into the addend delay line 28. After a period of $9t$, i.e., $3t+6t$, the add pulse is entered on the conductor 30.

The conductor 30 connects to a first input of each of two "and" units 41 and 42 provided for analyzing the sum to determine carry and no-carry conditions. The second input to the "and" unit 41 connects via a conductor 50 through a plurality of suitable isolating resistors to the various taps 22—0 through 22—9 of the delay lines 21, the second input to the "and" unit 42 being connected via a conductor 51 through suitable isolating resistors to the various taps 22—10 through 22—18 of the line 21. Each time an add pulse is applied to the delay line 21, therefore, signals taken from the taps 22—0 through 22—9 are serially applied via the conductor 50 to the second input of the "and" unit 41. Also, the signals taken from the taps 22—10 through 22—18 of the line 21 connect via the conductor 51 to the second input of the "and" unit 42. Thus, the pulse taken from the conductor 30 is mixed with pulses occurring at "0" time, at "1" time, etc., through "9" time in the unit 41, this pulse being mixed with signals occurring at "10" time, at "11" time, etc., through "18" time in the unit 42.

Assuming that the sum of the units order augend and addend digits is 9 or less, i.e., that no carry is to be generated, the add pulse is entered on the conductor 30 after a delay of $9t$ or less, and in this case this pulse passes through the "and" unit 41 and via a conductor 44 to the input of a delay line 43. If the sume of these digits is 10 or greater, i.e., if a carry is to be generated, the pulse taken from the conductor 30 passes through the "and" unit 42 and via a conductor 45 to a tapped input 46 of the delay line 43. The delay line 43 is arranged to provide a one-cycle delay of $30t$. The tapped input 46 of the delay line 43 shortens the delay provided by this line by an amount equal to $10t$. Thus, pulses entered via the conductor 45 into the delay line 43 are delayed thereby an amount equal to $30t$ minus $10t$. For convenience a cycle delay, i.e., a delay of $30t$, is referred to hereinafter as CD, a cycle delay minus $10t$ being referred to as CD—10. Thus, if the units order sum is 9 or less, the pulse taken from the conductor 30 is delayed by the line 43 by CD prior to its entry onto a conductor 47. Similarly, when the sum of the units order augend and addend digits exceeds 9, the pulses taken from the conductor 30 passes through the "and" unit 42 and through a portion of the delay line 43 to the conductor 47 after a delay of CD—10.

It should be understood that when the units order sum is 9 or less, i.e., when the first cycle add pulse appears on the conductor 30 prior to "10" time of the first cycle, this pulse is delayed by CD and is entered on the conductor 47 at a corresponding time during the second cycle. When the units order sum is greater than 9, i.e., when the first cycle add pulse appears on the conductor 30 after "9" time, this pulse is delayed by CD—10 prior to its entry on the conductor 47 during the second cycle. This condition results only when there is a carry from the units order addition and it is necessary to subtract 10 from the sum as well as to generate a carry signal to the next higher order, as will be described. By providing a delay of CD—10 when the sum exceeds 9, 10 is subtracted from the sum since the add pulse leaves the delay line 43 $10t$ earlier during the second cycle.

The output of the delay line 43 connects via the conductor 47 to a first input of each of several "and" units 48—0 to 48—9 inclusive. The second input to each of these units is taken from corresponding taps 22—0 through 22—9 as shown. Thus, the first cycle add pulse taken from the output of the delay line 43 via the conductor 47 is mixed with the second cycle add pulse signal in one of the various "and" units 48 corresponding to the sum of the units order digits of the augend and addend. When gated by the second cycle add pulse, the pulse taken from the conductor 47 is entered on the corresponding one of ten output taps 49—0 through 49—9 for indicating the units order of the sum. Thus, the sum of the units order augend and addend digits is determined, a signal indicative of the sum being arranged to appear on the appropriate tap 49 during the initial part of the second cycle.

As noted above, the tens order augend and addend digits are entered into the switches 23—00 through 23—90 and 35—00 through 35—90, the add pulse being arranged to pass through portions of the lines 21 and 31 according to the operation of these switches. This pulse, therefore, appears on the conductor 37 at a time corresponding to the sum of these digits. The conductor 37 connects to one input of each of four "and" units 53 through 56 as well as to the input of a delay line 57. The delay line 57 is arranged to provide a delay equal to CD+1 between the conductor 37 and a conductor 58 connected to the output tap thereof. In addition, three taps 59, 60 and 61 are provided which connect to three conductors 62, 63 and 64, respectively. The taps 59, 60 and 61 are so arranged, as indicated in the drawing, that the delay between the conductor 37 and the conductor 62 is equal to CD—10, the delay between the conductor 37 and the conductor 63 being equal to CD—9, and the delay between the conductor 37 and the conductor 64 being equal to CD. Thus, the first cycle add pulse taken from the conductor 37 and entered into the delay line 57 appears on each of the conductors 58, 62, 63 and 64 after being delay by CD+1, CD—10, CD—9 and CD, respectively.

As will become clear, the add pulse entered into the delay line 57 is gated from one of the conductors 58, 62, 63 or 64 according to the condition of corresponding "and" units 65 through 68 controlled in a manner to be described. For the present is should be understood that when the tens order sum is between 0 and 8 and there is a carry from the units order addition, it is necessary to delay the add pulse by CD+1 in order that this pulse will occur at the proper time during the second cycle. This delays the add pulse entered into the delay line 57 by 31*t*, thereby providing for the carry from the units order. If the tens order sum is between 9 and 18 and there is a carry from the units order addition, the pulse taken from the conductor 63 is selected, thereby providing a delay of CD—9. Since the sum lies between 9 and 18, it will be clear that when there is a units order carry, a carry to the hundreds order results, thereby rendering it necessary to subtract 10 from the result as well as to provide for the carry to the hundreds order. However, since there is a carry from the units order, a 1 should be added to the tens order sum. Thus, CD—10+1 =CD—9, and a delay of CD—9 is provided under these conditions to yield a pulse which occurs at the proper time during the second cyle. When there is no carry from the units order and the sum is between 0 and 9, the conductor 64 is selected, thereby controlling the add pulse to be delayed by CD and to occur at the same time during the second cycle. When the sum is between 10 and 18 and there is no carry from the units order, it is necessary to delay the add pulse by CD—10, as explained earlier, and under these conditions the conductor 62 is selected.

The conductors 58, 62, 63 and 64 connect to one input of a corresponding one of four "and" units 65 through 68 arranged for selecting one of these conductors. The output of each of these "and" units is connected through an "or" unit 69 to a conductor 70 which in turn connects to one input of each of ten "and" units 71—00 through 71—90. As will become clear, the signal gated by only one of the "and" units 65 to 68 inclusive is entered onto the conductor 70, this being determined by the conditions outlined above.

As mentioned above, the add pulse taken from the conductor 37 connects to one input of each of the "and" units 53 through 56 as well as to the delay line 57. The second input to the "and" unit 53 connects via a conductor 72 through suitable isolating resistors to each of the various taps 22—0 through 22—8 of the delay line 21. Thus, the conductor 72 is pulsed during "0" time, "1" time, etc., through "8" time. The second input to the "and" unit 54 connects to the conductor 50 which is pulsed each "0" time through "9" time. The second input to the "and" unit 55 connects via a conductor 73 through suitable isolating resistors to each of the taps 22—9 through 22—18, and it will therefore be clear that this conductor is pulsed each "9" time through "18" time. The second input to the "and" unit 56 connects to the conductor 51, which conductor, as described earlier, is pulsed each "10" time through "18" time.

The "and" units 53, 54, 55 and 56 are arranged to operate corresponding single-shot multivibrators 73, 74, 75 and 76, respectively, when there is a coincidence of pulses applied thereto. Thus, if the pulse taken from the conductor 37 occurs between "0" time and "8" time, the single-shot 73 is operated, thereby raising one input to an "and" unit 77 connected thereto. The second input to the "and" unit 77 connects via a conductor 78 to the output of another single-shot multivibrator 79 which is operated by signals taken from the conductor 45. It will be recalled that signals are entered on the conductor 45 only if the sum of the units order digits is greater than 9, i.e., only when there is a carry from the units order addition. Thus, if there is a carry from the units order addition, the "and" unit 77 is conditioned by the single-shot 79, and if the pulse taken from the conductor 37 represents a sum between 0 and 8, a single-shot multivibrator 80 connected to the output of the "and" unit 77 is operated for use as will be described.

The conductor 78 also connects to the second input of an "and" unit 81, the first input of which is connected to the single-shot multivibrator 75. Thus, if there is a carry from the units order addition and the pulse entered on the conductor 37 occurs between "9" time and "18" time, the multivibrator 75 is operated. This causes a coincidence of signals on the "and" unit 81 and operates a single-shot 82 connected to the output of the unit 81.

The conductor 44 connects to a single-shot multivibrator 83 and since pulses are entered on the conductor 44 only when the sum of the units order digits is 9 or less, i.e., when there is no carry from the units order addition, the single-shot 83 is operated when there is no carry. The output of the single-shot 83 connects via a conductor 84 to the second input of each of two "and" units 85 and 86. The first input to the unit 85 connects to the output of the single-shot 74, the first input to the "and" unit 86 being connected to the output of the single-shot 76. The output of the unit 85 is arranged to operate a single-shot multivibrator 87, the output of the unit 86 being arranged to operate a single-shot multivibrator 88. Thus, when the first cycle add pulse entered on the conductor 37 occurs between "0" time and "9" time, the single-shot multivibrator 74 is operated. Further, if there is no carry from the units order addition, there is a coincidence in the "and" unit 85 and the single-shot 87 is operated. Additionally, when the single-shot 76 is operated, i.e., when the tens order sum is between 10 and 18, and if there is no carry from the units order addition, there is a coincidence in the "and" unit 86, thereby operating the single-shot 88.

The outputs of the single-shots 80, 87, 82 and 88 connect to the "and" units 65, 68, 67 and 66, respectively, for controlling the selection of output taps from the delay line 57. Thus, if there is a units order carry and the tens order sum is between "0" and "8," the single-shot 80 is operated, thereby conditioning the "and" unit 65 to permit the signal taken from the conductor 58 connected to the delay line 57 to pass through the unit 65 and through the "or" gate 69 to the conductor 70 after a delay of CD+1. This controls the addition of the units order carry to the tens order sum. If there is no carry from the units order addition and the sum of the tens order lies between 0 and 9, the single-shot 87 is operated, thereby conditioning the "and" unit 68 to pass signals taken from the conductor 64 connected to the CD tap 61 of delay line 57. Under these conditions the add pulse taken from the conductor 37 is delayed one cycle prior to its entry on the conductor 70.

The single-shot 82 is operated, thereby conditioning the "and" unit 67, when there is a carry from the units order and the sum of the tens order digits lies between 9 and 18. In this case the add pulse is taken from the tap 60 of delay line 57 via the conductor 63 after a delay of CD—9. This pulse passes through the "and" unit 67 and through the "or" unit 69 to the conductor 70. The single-shot 88 is operated, thereby conditioning the "and" unit 66, when the tens order sum lies between 10 and 18 and there is no carry from the units order addition. This permits passage of the pulse taken from the conductor 62 through the "and" unit 66 and "or" unit 69 to the conductor 70, thereby delaying this pulse by CD—10 in the delay line 57. Thus, it should now be clear that the provision for all carries, including carries resulting from carries, is made by a suitable selection of the output taps of the delay line 57, the add pulse entered on the conductor 70 occurring at a time during the second cycle corresponding to the sum of the tens order digits plus carriers, if any, from the units order addition. It was mentioned previously that the conductor 70 connects to one input of each of ten "and" units 71—00 through 71—90. The second input to each of these units is taken from the taps 22—0 through 22—9 of the delay line 21 and a coincidence of signals in one of these units controls the corresponding output tap 90—00 through 90—90 to indicate the corrected sum of tens order digits.

The circuitry for the hundreds order and any succeeding order that may be provided is substantially the same as that described in connection with the tens order, the selection of the various taps of the delay line 91, which corresponds to the line 57, being accomplished identically. Carries from the addition of tens order digits are indicated by the condition of a conductor 94 connected to the output of an "or" unit 95, the no-carry condition being indicated by the condition of a conductor 92 connected to the output of an "or" unit 93. This is true since the outputs of the single-shots 82 and 88 connect via conductors 98 and 99, respectively, to the inputs of the "or" unit 95, these conductors being arranged to go up in potential when the corresponding single-shot 82 or 88 is operated. It will be recalled that one or both of these single-shots is operated only when there is a carry resulting from the addition of tens order digits. In a similar manner two conductors 96 and 97 which connect to the input of the "or" unit 93 are connected to the output taps of the single-shots 80 and 87 and these conductors rise, therefore, when no carry results from the addition of tens order digits.

The carry conductor 94 connects to the second input of each of two "and" units 77′ and 81′, the no-carry conductor 92 being connected to the second input of each of two "and" units 85′ and 86′. The conductors 92 and 94 are thus arranged to control the passage of signals through the "and" units 77′, 85′, 81′ and 86′ in a manner similar to the way in which the conductors 78 and 84 control the passage of signals through the "and" units 77, 85, 81 and 86 of the tens order circuitry. The output of the "and" units 77′, 85′, 81′, and 86′ is arranged to operate corresponding single-shot multivibrators 80′, 87′, 82′ and 88′ for controlling the selection of output taps from delay line 91. Thus, depending upon the hundreds order sum and the carries from the tens order addition, the add pulse is taken from one of the taps of the delay line 91 through one of the "and" units 65′, 68′, 67′ or 66′ and through "or" unit 69′ to a conductor 70′ which connects to one input of each of ten output "and" units 93″—000 through 93″—900. As was the case with the tens order output circuitry, the first cycle add pulse entered on the conductor 70′ is mixed with a second cycle add pulse in one of ten output "and" units 93″—000 to 93″—900 inclusive, according to the sum, for entering a signal on the corresponding output tap 94″ for indicating the hundreds order sum.

Since the present embodiment is directed to circuitry for adding only three orders, a carry from the hundreds order indicates an overflow. This condition is indicated by a signal entered on a conductor 94′ connected to the output of an "or" unit 95′, the conductor 94′ being arranged to rise when one of the single-shots 82′ or 88′ is operated. A no-overflow condition is indicated by the conductor 92′ connected to the output of an "or" unit 93′, the inputs to the unit 93′ being connected to the output taps of the single-shots 80′ and 87′. Thus, if an overflow results, the conductor 94′ rises, the conductor 92′ being arranged to rise when no overflow results. It should be clear that if the addition of successive orders is to be provided for by the provision of additional circuitry similar to that described above, the conductors 94′ and 92′ may be arranged to operate or control the selection of carry conditions in a manner similar to that described in connection with the conductors 92 and 94.

To illustrate the operation of the present invention, let it be assumed that it is desired to add 179 to 683. In this example the augend switches 23—600, 23—80 and 23—3 are operated, the addend switches 36—100, 35—70 and 29—9 being operated also. The add pulse is then entered onto the conductor 40 for passage to delay line 21. This signal is thereafter entered onto the conductors 26, 25 and 24 at "6," "8" and "3" times, respectively, for entry onto the addend delay lines 32, 31 and 28, respectively. Since the switches 36—100, 35—70 and 29—9 are operated, this signal appears on the conductors 38, 37 and 30 at "7" time, "15" time and "12" time, respectively, for indicating the summation of the corresponding orders of the augend and addend. The signal entered onto the conductor 30 occurs at "12" time and it is therefore controlled to pass through the "and" unit 42 and the conductor 45 to the tap 46 of the delay line 43, as well as to operate the single-shot 79 for indicating a carry from the addition of units order digits. Thus, the signal taken from the line 30 is delayed by CD—10 prior to its entry onto the conductor 47, this signal therefore being arranged to appear on the conductor 47 at "2" time during the second cycle. Since the second cycle is initiated by a second add pulse following the first add pulse by $30t$, it will be clear that the first add pulse present on the conductor 47 is mixed in the "and" unit 48—2 with the second cycle add pulse for indicating on the tap 49—2 that the sum of the units order digits is 2.

As mentioned, the first cycle add pulse appears on the conductor 37 at "15" time and will therefore pass through the "and" unit 55 for operating the single-shot 75. Since there is a carry during the addition of units order digits, the conductor 78 is high and the single-shot 82 is operated for conditioning the "and" unit 67 to pass the signal taken from the tap 60 of the delay line 57. Since this tap is arranged to provide a delay of CD—9, it should be clear that the pulse taken from the conductor 37 is entered onto the conductor 63 at "6" time during the second cycle, thereby providing for the carry from the units order as well as subtracting 10 in the present order. This signal therefore passes through the "and" unit 67 and "or" unit 69 to the conductor 70 and is mixed in the "and" unit 71—60 with the second cycle add pulse for indicating the tens order of the sum by raising the potential of the tap 90—60.

In a similar manner the first cycle add pulse taken from the conductor 38 is entered into the delay line 91 as well as into each of the "and" units 53′, 54′, 55′ and 56′. Since this sum is between 0 and 8, this signal passes through both of the "and" units 53′ and 54′ for operating the single-shot multivibrators 73′ and 74′. Since there was a carry during the addition of the tens order digits, the "and" unit 77′ is conditioned and single-shot 80′ is operated. In this way the "and" unit 65′ is conditioned and the add pulse entered into the delay line 91 is taken from the end thereof after a delay of CD+1. Since this signal is entered into the delay line 91 at "7" time during the first cycle, it is taken therefrom at "8" time during the second cycle. This signal passes through the "and" unit 65′ and "or" unit 69′ to the conductor 70′ and since it occurs at "8" time during the second cycle, it is mixed in the output "and" unit 93″—800 with the second cycle add pulse taken from the tap 22—8 of the delay line 21 and is therefore entered onto the output tap 94″—800 for indicating the hundreds order of the sum.

Thus, it will now be clear that, regardless of the resulting carries, the sum of the augend and addend appears on the proper output taps during the initial part of the second cycle, the various carries as well as carries resulting from carries being provided for during the latter part of the first cycle. In the example discussed above, the signals taken from the output taps 94″—800, 90—60 and 49—2 indicate that the sum of the numbers 683 and 179 is 872, these signals occurring on the output taps during the initial part of the second cycle. Other examples with different conditions of carries, etc., control the selection of suitable output taps in the delay lines 57 and 91 and the selection of input taps of the delay line 43 for determining the sum signals and for entering them on the output conductors 47, 70 and 70′ at the proper time.

The embodiment of the subtracter of the invention is shown in FIG. 4 and is directed to a parallel type subtraction circuit arranged for handling the subtraction of a three-order subtrahend from a three-order minuend. Much of the cricuitry shown in FIG. 4 is a duplication of circuitry shown in FIG. 1 and in a practical application suitable switching would be provided for utilizing the same circuitry to perform both addition and subtraction. To permit a clearer understanding of each of the addition and subtraction circuits, however, the switching has been omitted and the duplicate circuitry has been provided.

Referring now to FIG. 4, means are provided for establishing delays representative of the various orders of the minuend, such means being in the form of a delay line 110 having a plurality of equally spaced taps 111 therealong.

Each of the taps 111 connects through a suitable isolating resistor and through a corresponding *n/o* minuend units order switch 112 to a conductor 113. In addition, the tens order minuend switches 114 connect between a conductor 115 and corresponding taps 111 through suitable isolating resistors, the hundreds order minuend switches 116 being connected between a conductor 117 and through suitable isolating resistors to the corresponding taps 111. Entry of the minuend into the delay line 110 is accomplished by selectively operating the switches 112, 114 and 116. For example, to enter a minuend such as 405 into the minuend delay line the switches 116—400, 114—00 and 112—5 are operated for connecting the taps 111—4 to the conductor 117, 111—0 to the conductor 115 and 111—5 to the conductor 113, respectively.

The conductors 113, 115 and 117 connect to the input of corresponding delay lines 118, 119 and 120 which are provided with taps 121, 122 and 123, respectively. The delay line 118 is the units order subtrahend delay line, the lines 119 and 120 being the tens order and hundreds order subtrahend delay lines. The units order of the subtrahend is entered into the delay line 118 by means of switches 124 which connect between a conductor 125 and the corresponding tap 121 of the line 118. Similarly, the tens order of the subtrahend is entered into the delay line 119 by means of switches 126 which connect between a conductor 127 and the corresponding taps 122 of the line 119. In addition, the taps 123 of the hundreds order delay line 120 connect through corresponding switches 128 to a conductor 129.

The delay provided between adjacent taps on each of the lines 118, 119 and 120 corresponds to the delay between adjacent taps of the line 110 and is referred to herein as equal to a time *t*. A signal entered into the delay line 110 via a conductor 130 is entered onto the conductors 113, 115 and 117 according to the condition of the various switches 112, 114 and 116, the delay provided such a signal being determined according to which of the several switches are operated. Since the delay between adjacent taps on any of the various delay lines is equal to *t*, it will be clear that the signal entered on the conductor 130 into the delay line 110 is entered onto the conductor 113 after a period of $nt$ wherein $n$ is equal to the units order of the minuend. Similarly, this signal is entered onto the conductors 115 and 117 after having been delayed amounts corresponding to the tens and hundreds orders of the minuend.

The signals taken from the conductors 113, 115 and 117 connect to the inputs of the three subtrahend delay lines 118, 119 and 120 wherein these signals are further delayed according to the tens complement of the corresponding order of the subtrahend. Thus, the delay provided by the units order subtrahend delay line 118, for example, is equal to $10t-mt$ wherein $m$ is equal to the units order of the subtrahend. Referring only to the minuend and subtrahend units order circuitry, a signal entered on the conductor 130 is delayed a period of time equal to $nt+10t-mt$ prior to its entry onto the conductor 125. Hereinafter the signals on conductors 125, 127 and 129 are referred to as the difference signals since they occur at times corresponding to the difference of the minuend and subtrahend.

The conductor 125 connects to one input of each of two "and" gates 131 and 132 which are provided for analyzing the units order difference signal for determining the necessary corrections thereto. Since subtraction is accomplished by complement addition, it is necessary to determine whether the sum of the minuend and the tens complement of the subtrahend is less than 10 or greater than 9 to provide these corrections. Thus, if the units order difference signal is delayed an amount greater than $9t$, no borrow is necessary; however, in this instance it is necessary to subtract 10 from the result to yield the correct difference. If the signal taken from the conductor 125 has been delayed by less than $10t$, it is necessary to generate a borrow signal, and in this case the delay of the units order difference signal is correct and need not be altered. For these reasons a conductor 133 connects to the second input of the "and" gate 131 and a conductor 134 connects to the second input of the "and" gate 132.

The conductor 133 connects to each of the taps 111—0 through 111—9 via suitable isolating resistors, the conductor 134 being connected via isolating resistors to each of the various taps 111—10 through 111—19. Thus, signals are applied to the conductor 133 each "0" through "9" time and signals are applied to the conductor 134 each "10" through "19" time. If the units order difference signal occurs prior to "10" time, it will pass through the gate 131 to a conductor 135 connected to the output thereof. Similarly, if this signal occurs after "9" time, it will pass through the gate 132 to a conductor 136.

The conductor 135 connects to the input of a cycle delay line 137 arranged to provide a cycle delay (CD) which is equal to the time interval between successive pulses applied via the conductor 130 to the input of the delay line 110. A cycle delay, or CD as it is referred to herein, is a convenient period of time which must equal a period of at least $19t$. Thus, units order difference signals passing through the gate 131 to the conductor 135, i.e., those signals which occur prior to "10" time, are entered into the cycle delay line 137 and are taken therefrom via a conductor 138 after a delay of CD. Signals entered on the conductor 136 are connected thereby to a tap of the delay line 137 arranged to provide a delay equal to one cycle minus $10t$ ($CD-10t$) prior to the entry thereof onto the conductor 138. Thus, units order difference signals which occur after "9" time are delayed by an amount equal to $CD-10t$ prior to their entry onto the conductor 138.

It should be clear that signals entered onto the conductor 125 which correspond to a sum which is less than 10 are entered via the conductor 135 into the delay line 137 where they are delayed by CD, these signals being entered onto the conductor 138 at a corresponding time during the next following cycle. Also, signals taken from the conductor 125 which corresponds to a sum greater than 9 are entered via the conductor 136 to the tapped input of the line 137 where they are delayed by an amount equal to $CD-10t$ prior to their entry onto the conductor 138. Thus, the units order difference signals are corrected when necessary and appear on the conductor 138 during the next following cycle at a time corresponding to the units order of the difference.

In addition to connecting to the delay line 137, the conductor 135 connects to a single-shot multivibrator 139, and when a signal appears on the conductor 135, the single-shot 139 is operated for indicating a borrow from the tens order. The normal condition of the single-shot 139 is such that a conductor 140 is normally high for indicating that there is no units order borrow, a conductor 141 being normally low; however, when operated by the application of a signal via the conductor 135, the condition of the single-shot 139 is reversed, thereby lowering the potential of the conductor 140 and raising the potential of the conductor 141. The signals taken from the conductors 140 and 141 are utilized to control corrections to the tens order difference signals taken from the line 127, as will become clear.

The conductor 127 associated with the output of the tens order subtrahend delay line 119 connects to the input of a delay line 142 as well as to one input of each of two "and" gates 143 and 144. The gates 143 and 144 are provided for detecting a borrow from the hundreds order. As above, a borrow is indicated when the tens order difference signal occurs between "0" and "9" time, and for this reason the conductor 133 connects to the second input of the "and" gate 143 for controlling the output of this gate to go up when the tens order difference signal occurs between "0" and "9" time. Additionally, when there is a units order borrow, it is necessary to generate a tens order borrow if the tens order difference signal occurs between "0" and "10" time. Accordingly, the units order borrow conductor 141 connects to a second input of the "and" gate 144 and a conductor 145 connects between the third input to the gate 144 and through suitable isolating resistors to each of the several taps 111—0 through 111—10 of the delay line 110. Thus, if the signal taken from the conductor 127 occurs between "0" and "10" time and there was a units order borrow, the output of the "and" gate 144 rises. The outputs of the gates 143 and 144 connect through an "or" circuit 146 for operating a single-shot multivibrator 147 under either of these conditions. The normal condition of the single-shot 147 is such that a "no-borrow" conductor 148 is high, the "borrow" conductor 149 being low; however, when the tens order difference signal passes through either of the "and" gates 143 and 144, the single-shot 147 is operated for reversing this condition, thereby lowering the potential of the no-borrow conductor 148 and raising the potential of the borrow conductor 149 for indicating a tens order borrow.

As was mentioned above, the conductor 127 connects to the input of the delay line 142. This line is provided with several taps arranged to provide the various delays indicated in the drawing. Thus, the delay provided by the delay line 142 between the conductor 127 and a conductor 151 is equal to CD, the delay between the conductor 127 and a conductor 152 being equal to CD$-1t$, the delay between the conductor 127 and a conductor 153 being equal to CD$-10t$, and the delay between the conductor 127 and a conductor 154 being equal to CD$-11t$. Signals taken from the conductors 151 through 154 connect through corresponding "and" gates 155 through 158 and an "or" gate 159 to a conductor 161 according to the condition of the various inputs to the several gates 155 through 158.

The conductor 151 connects to one input of the gate 155, a second input of which connects to the units order no-borrow conductor 140 and a third input of which connects to the 0 through 9 conductor 133. Thus, if there is no units order borrow and the tens order difference signal occurs prior to "9" time, this signal passes through the "and" gate 155 and the "or" gate 159 to the conductor 161 during the second cycle at a corresponding time.

The conductor 152 connects to one input of the "and" gate 156, the second input of which connects to a conductor 160 which is high if the tens order difference signal occurs prior to "11" time and if there was a units order borrow. This is true since the conductor 160 connects to the output of a single-shot multivibrator 150 which is operated to raise the potential of the conductor 160 by signals passing through the gate 144. Thus, if there is a units order borrow and the tens order difference signal occurs prior to "11" time, the signal taken from the conductor 152 is gated through the "and" gate 156 and the "or" gate 159 to the conductor 161 and is entered onto the conductor 161 after CD$-1t$.

The conductor 153 connects to one input of the "and" gate 157, a second input of which connects to the units order no-borrow conductor 140, the third input thereof being connected to a conductor 162. The conductor 162 is high if the tens order difference signal occurs after "9" time. A conductor 163 connects through suitable isolating resistors to each of the taps 111—10 through 111—19 of the delay line 110, and signals taken from these taps are connected via conductor 163 to one input of an "and" gate 164, the second input of this "and" gate being connected to the conductor 127. The output of the gate 164 connects to a single-shot multivibrator 165 which is operated when both inputs to the "and" gate 164 are high. Since the conductor 162 connects to the output of the single-shot 165, this conductor, and thus the third input to the "and" gate 157, is high if the tens order difference signal occurs after "9" time. Thus, the signal taken via the conductor 153 from the delay line 142 after a delay of CD$-10t$ is entered through the "and" gate 157 and "or" gate 159 to the conductor 161 if there is no units order borrow and if the tens order difference signal occurs after "9" time.

Signals taken from the delay line 142 via the conductor 154 pass through the "and" gate 158 and "or" gate 159 to the conductor 161 if there is a units order borrow and if the tens order difference signal occurs after "10" time. Under these conditions the tens order difference signal is entered onto the conductor 161 after a delay of CD$-11t$. Thus, a second input to the "and" gate 158 connects to the units order borrow conductor 141 and the third input to this gate conductor via a conductor 166 to the output of a single-shot multivibrator 167. Tens order difference signals are mixed in an "and" gate 169 with signals taken from a conductor 168 which connects through suitable isolating resistors to each of the tape 111—11 through 111—19 of the delay line 110, and the output of the "and" gate 169 connects to a single-shot multivibrator 167. When signals are present on both of the inputs of the "and" gate 169, the single-shot 167 is operated to raise the potential of conductor 166. Thus, when the tens order difference signal occurs after "10" time and there is a units order borrow, signals taken from the conductor 154 are entered onto the conductor 161.

The structure for providing corrections to the hundreds order difference signal is substantially identical to the structure for correcting the tens order difference signal described above, and for this reason an additional description thereof is not given herein. It will be noted that corresponding circuit components have been given similar reference numerals which have been primed when used in connection with the hundreds order circuitry.

Thus far, the circuitry for entering signals onto the conductors 138, 161 and 161′, which are representative of the difference between the minuend and subtrahend, has been described, these signals being arranged to appear on these lines at times corresponding to the corresponding orders of the difference. It is now necessary only to interpret these signals for defining the difference. For this reason the conductor 138 connects to one input of each of ten "and" gates 171, the conductor 161 connects to one input of each of ten "and" gates 172, and the conductor 161′ connects to one input of each ten "and" gates 173. The second input of each of the "and" gates 171—0 through 171—9, 172—0 through 172—9 and 173—0 through 173—9 connects to a corresponding tap 111—0 through 111—9 of the delay line 110.

A coincidence of signals on one of the "and" gates 171, 172 or 173 causes a signal to appear on a corresponding output tap 174, 175 or 176, respectively, for indicating the difference of the minuend and subtrahend. Thus, when there is a signal on the tap 173—3, for example, this indicates that the units order of the difference is equal to 3. Similarly, a signal on the tap 176—600 indicates that the hundreds order of the difference is equal to 6. Thus, the difference of the numbers entered into the minuend switches 112, 114 and 116 and into the subtrahend switches 124, 126 and 128 is indicated according to the occurrence of signals on the various taps 174, 175 and 176.

As is well known in the art, a borrow during the subtraction of the high order digits indicates that the result of the subtraction is negative. Thus, if the single-shot 147′ is operated, the conductor 149′ is high and indicates that there is a borrow during the subtraction of the high order digits. This indicates that the difference between the minuend and subtrahend is negative for guiding further operations as may be deemed necessary. In this case the complement of the difference is indicated on taps 174, 175 and 176.

To illustrate the operation of the invention, two examples are given, one of which yields a positive result while the other yields a negative result. In the first of these two examples, let it be assumed that a subtrahend of 153 is to be subtracted from a minuend of 382. The minuend is entered into the switches 112, 114 and 116 by operating the switches 112—2, 114—80 and 116—300. Additionally, the subtrahend is entered into the switches 124, 126 and 128 by operating the switches 124—3, 126—50 and 128—100. At this time the subtraction operation is initiated by entering a pulse, generated by means not shown, on the conductor 130.

This pulse causes a signal to appear on the conductor 112 at "2" time, i.e., after a delay equal to $2t$. Similarly, signals appear on the conductors 115 and 117 at "8" time and "3" time, respectively. These signals connect into the corresponding delay lines 118, 119 and 120. The signal entered into the delay line 118 passes through the switch 124—3 to the conductor 125 after a further delay of $7t$ (the tens complement of 3). Thus, the total delay of the units order difference signal is equal to $9t$. Since this signal occurs at "9" time, it is gated through the "and" gate 131 to the delay line 137 and is taken therefrom after a delay of CD, i.e., at "9" time during the next following cycle. In a similar manner the signals taken from the conductors 115 and 117 connect to the delay lines 119 and 120 for entry into conductors 127 and 129 after being further delayed by amounts equal to $5t$ and $9t$, respectively. Thus, the tens and hundreds order difference signals are delayed a total of $13t$ and $12t$, respectively. These signals connect to the delay lines 142 and 142'.

The tens and hundreds order difference signals are analyzed by the "and" gates 143, 144, 143' and 144' for determining tens and hundreds order borrows. Since the tens and hundreds order difference signals in the present example occur after "10" time, no borrow is generated and the single-shots 147 and 147' are not operated, thereby maintaining the conductors 148 and 148' high. The signals taken from the various outputs of the delay lines 142 and 142' are then analyzed for gating them onto the conductors 161 and 161'.

In the case of the tens order difference signal entered into the delay line 142, the signal is taken via the conductor 154 to one input of the "and" gate 158. A second input to the "and" gate 158 connects to the units order borrow conductor 141 and is high at this time since there was a borrow during the units order subtraction. The third input to the "and" gate 158, however, connects to the ouput of the single-shot multivibrator 167 which is operated if, and only if, the tens order difference signal occurs after "10" time. Since this is the case in the present example, all three inputs to the "and" gate 158 are high, thereby permitting passage of the signal taken from the conductor 154 therethrough and through the "or" gate 159 to the conductor 161. The signal taken from the delay line 142 via the conductor 153 cannot pass through the "and" gate 157 since the units order no-borrow conductor 140 is low. Similarly, the signals taken from the delay line 142 via the conductors 152 and 151 cannot pass through the "and" gates 156 and 155, respectively, since the conductors 160 and 140, respectively, are low. Thus, the tens order difference signal is delayed by an amount equal to CD—$11t$ prior to its entry on the conductor 161.

In a similar manner, the hundreds order difference signal is taken from the conductor 153' and through the "and" gate 157 and "or" gate 159' to the conductor 161' after a delay equal to CD—$10t$. This is true since the tens order no-borrow conductor 148 is high and since the single-shot 165' is operated. Further analysis will reveal that the signals entered onto the lines 154', 152', and 151' do not pass through the "and" gates 158', 156' and 155', respectively, for reasons similar to those stated above.

Thus, the signal taken from the conductor 138 occurs at "9" time, at which time it is applied to one input of the various "and" gates 171. Also, at this time the second cycle pulse entered on the conductor 130 appears at the second input to the "and" gate 171—9. Thus, an output signal appears on the tap 174—9 for indicating that the units order of the difference is equal to 9. The signal entered onto the conductor 161 is applied to one input of each of the "and" gates 172 at the same time that the second cycle pulse is applied to the second input of the "and" gate 172—20, i.e., at "2" time. Thus, a coincidence occurs in the "and" gate 172—20 for causing an output signal to appear on the tap 175—20 to indicate that the tens order of the difference is equal to 2. Similarly, the signal entered onto the conductor 161' is applied to one input of each of the "and" gates 173 at a time when the second cycle pulse is applied to the second input of the "and" gate 173—200. Thus a signal appears on the output tap 176—200 for indicating that the hundreds order of the difference is equal to 2. In the present example, therefore, a difference of 229 is indicated by the signals appearing on the taps 176—200, 175—20 and 174—9, and since the single-shot 147' is not operated, the hundreds order borrow conductor 149' is low, thereby indicating that the answer is positive and is in true form.

In the second of the two examples referred to above, let it be assumed that the minuend is equal to 461 and that the subtrahend is equal to 650. The desired answer is 189; however, the circuitry of the invention is arranged to generate a difference of 811 which, due to the borrow during the subtraction of the high order digits, is a negative number in complement form, i.e., when the answer is negative, it is taken from the various taps 174, 175 and 176 in complement form, the signal generated by the single-shot multi-vibrator 147' being arranged to indicate this condition. The minuend is entered into the switches 112, 114 and 116 by operating the switches 112—1, 114—60 and 116—400. Similarly, the subtrahend is entered into the switches 124, 126, and 128 by operating the switches 124—0, 126—50 and 128—600.

When the first cycle pulse is entered into the delay line 110, it is taken therefrom via the conductors 113, 115 and 117 at "1" time, "6" time and "4" time, respectively, for entry into the delay lines 118, 119 and 120 as described above. Due to the selection of switches 124, 126 and 128, which have been operated according to the subtrahend, these signals appear on the conductors 125, 127 and 129 at "11" time, "11" time and "8" time, respectively. Thus, the units order difference signal passes through the "and" gate 132 for entry into the delay line 137 via the conductor 136. This signal appears on the conductor 138 after CD—$10t$, i.e., at "1" time during the next following cycle, for causing a signal to appear on the output tap 174—1 to indicate that the units order of the difference is equal to 1.

The tens order difference signal is entered into the delay line 142 and taken therefrom via the conductor 153 for passage through the "and" gate 157 and "or" gate 159 to the conductor 161. This is true since the units order no-borrow conductor 140 is high at this time (the single-shot 139 was not operated) and since the conductor 162 connected to the output of the single-shot 165 is high (the tens order difference signal occurred after "9" time). Thus, the signal entered onto the conductor 161 has been delayed by CD—$10t$ and occurs at "1" time during the second cycle. This causes an output signal to appear on the tap 175—10 for indicating that the tens order of the difference is equal to 1.

The hundreds order difference signal is entered into the delay line 142' and is taken therefrom via the conductor 151' through the "and" gate 155' and "or" gate 159' to the conductor 161' after having been delayed by CD. Thus, this signal appears on the conductor 161' at "8" time during the second cycle for controlling a signal to appear on the output tap 176—800. In the present example a difference of 811 is indicated by the signals appearing on the output taps 176—800, 175—10 and 174—1.

In addition to entry into the delay line 142' the hundreds order difference signal passes through the "and" gate 143', since this signal occurs prior to "10" time, for operating the single-shot 147'. Thus, the potential of the conductor 149' is high, indicating that a borrow is necessary during subtraction of hundreds order digits, thereby indicating that the difference of the two numbers is negative and is represented in complement form on the various taps 174, 175 and 176. The difference 811 indicated by the signals appearing on the output taps 174, 175 and 176 therefore represents a difference of −189 as is desired.

In summary, therefore, the subtracter of the invention is arranged to provide for the addition of a delay corresponding to the minuend to a delay corresponding to the complement of the subtrahend, the sum of these delays being analyzed for decoding into the corresponding difference.

Figure 3:
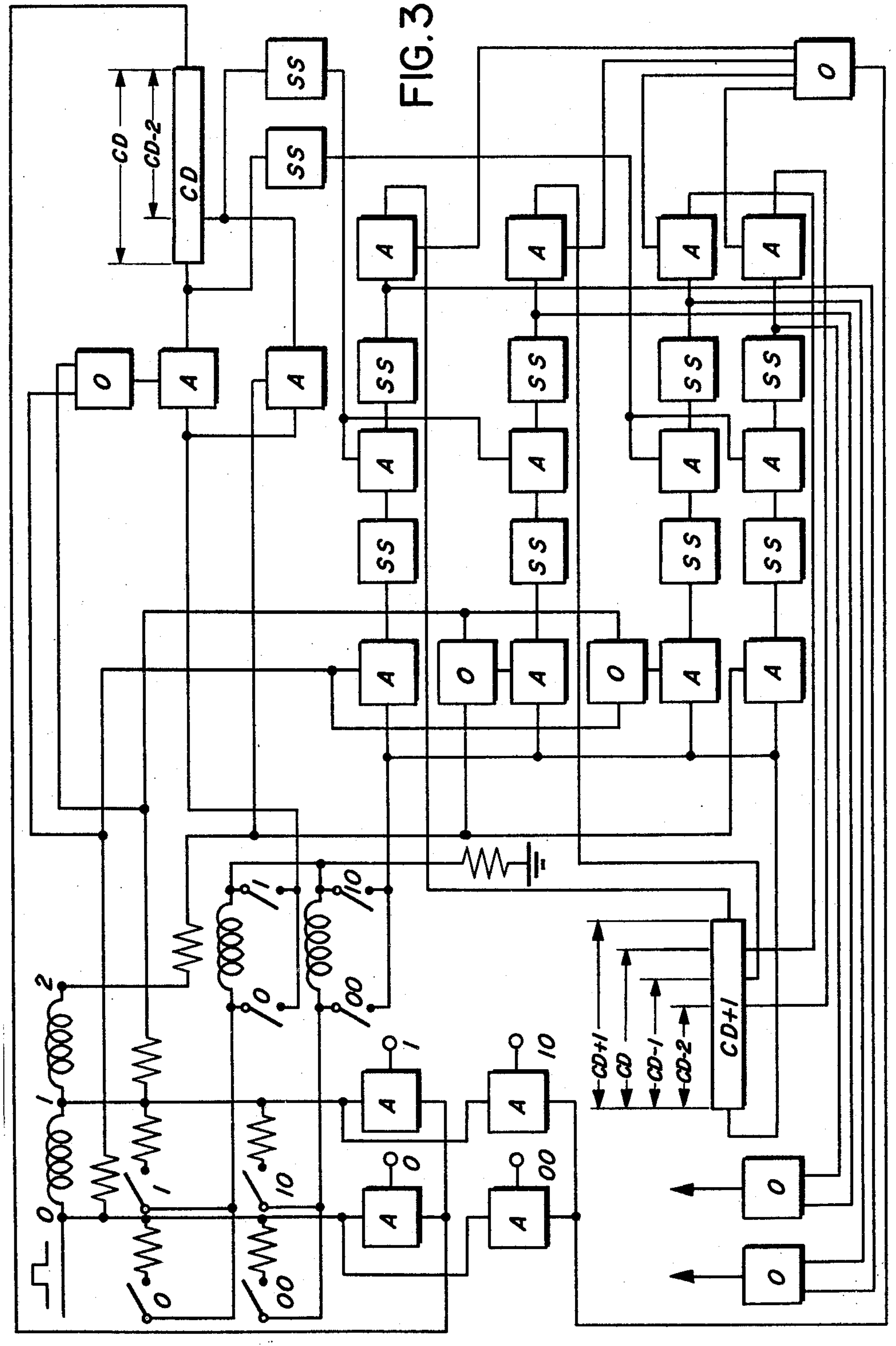
FIG. 3 is a schematic diagram of an embodiment of the invention adapted to add binary numbers.

While there have been shown and described and pointed out the fundamental novel features of the invention as applied to the preferred embodiments thereof, it will be understood that various omissions and substitutions and changes in the form and details of the device illustrated and in its operation may be made by those skilled in the art without departing from the spirit of the invention. For example, it should be noted that the present invention is adapted to other number systems and is not restricted to the decimal system. Referring to FIG. 3 a two order adder arranged for adding binary numbers is illustrated. As will be noted from the drawing this circuit is similar to the circuitry shown in FIGS. 1 and 2, the only differences being brought about by the different radices of the number systems involved, i.e., 10 and 2. In the binary adder shown in FIG. 3, carries are generated when the sum exceeds 1, a carry from a carry resulting when the initial sum exceeds 0. Thus, the logic circuitry provides for delays of CD−2 and CD, when there is no carry from a lower order (or when there is no lower order), which are used according to whether or not, respectively, there is a carry to the next higher order. Additionally, delays of CD−1 and CD+1 are provided for use when there is a carry from the lower order according to whether or not there is a carry to the next higher order. It is the intention therefore to be limited only as indicated by the scope of the following claims.

What is claimed is:

1. In combination, a first delay line means settable according to a first number, a second delay line means settable according to a second number, and means for determining the sum of the delays afforded by said first and second means for establishing the sum of said numbers.

2. An adder comprising a first delay line settable according to a first number, a second delay line settable according to a second number, and means for determining the sum of the lengths of said lines for establishing the sum of said numbers.

3. In combination, a first delay means, means for entering a signal in said first delay means and for taking it therefrom after a period of time determined by a first number, a second delay means, means for entering the signal taken from said first delay means in said second delay means and for taking it therefrom after a period of time determined by a second number, and means for determining the time elapsed between the time said signal is entered in said first delay means and the time it is taken from said second delay means.

4. In combination, a first delay means, means for entering a signal in said first delay means and for taking it therefrom after a first period of time determined by a first number, a second delay means, means for entering the signal taken from said first delay means in said second delay means and for taking it therefrom after an additional period of time determined by a second number, and means for determining the sum of said first period of time and said additional period of time for establishing the sum of said first and second numbers.

5. In combination, a first delay line means settable according to a first number, a second delay line means settable according to a second number, and means including said first delay means for determining the sum of the delays afforded by said first and second delay means for establishing the sum of said numbers.

6. In combination, a first delay line having a plurality of taps provided therealong, a coincidence circuit associated with each of said taps, a second delay line having a plurality of taps provided therealong, means for selectively connecting the taps of said first line to the input of said second line, means for selectively connecting the taps of said second line to all of said coincidence circuits, and means for applying a signal to the input of said first line, whereby a coincidence of signals applied to one of said coincidence circuits indicates the sum of the delays afforded by said first and second delay lines.

7. In combination, a first delay line having an input tap and a plurality of output taps provided therealong, means for connecting signals to said input tap, a plurality of "and" circuits, each of said taps being arranged to condition a corresponding "and" circuit when a signal is present thereon, a second delay line having an input tap and a plurality of output taps provided therealong, means for connecting signals from selected output taps of said first delay line to the input tap of said second delay line, and means for connecting signals from selected output taps of said second delay line to said "and" circuits, whereby a coincidence of signals in one of said "and" circuits determines the sum of the delays afforded by said delay lines according to said selected output taps.

8. An adder comprising first and second variable delay line means, means for determining the length of said first and second delay means according to first and second numbers to be added, means for connecting a signal for serial passage through said first and second delay means for delaying said signal an amount corresponding to the sum of said first and second numbers, and means for determining the sum of said numbers according to the delay of said signal through said first and second delay means.

9. The invention set forth in claim 8 wherein said determining means includes a plurality of gating means successively conditioned at succeeding intervals and means for connecting the signal taken from said second delay means to said plurality of gating means whereby said signal passes through the gating means corresponding to said sum.

10. An adder comprising a first variable delay means settable according to a first number to be added, a second variable delay means settable according to a second number to be added, means for connecting a first signal for serial passage through said first and second delay means, a plurality of gating circuits equal in number to the radix of the number system being used, said gating circuits corresponding to possible sums of said first and second numbers, means responsive to a second signal for successively conditioning said gating means, said second signal following said first signal by a time CD, means for analyzing the signal taken from said second delay means for determining whether or not it corresponds to a sum which exceeds said radix, and means for connecting the signal taken from said second delay means to said gating circuits, said means including means responsive to a determination that the signal taken from said second delay means corresponds to a sum which is less than said radix for delaying said signal by CD prior to its being connected to said gating circuits and means responsive to a determintion that the signal taken from said second delay means corresponds to a sum which is equal to or greater than said radix for delaying said signal an amount equal to CD minus said radix prior to its being connected to said gating circuits, whereby there is a coincidence of signals on the gating circuit corresponding to the sum of said first and second numbers.

11. An adder comprising first delay line means for delaying a signal a period of time corresponding to a first number, a second delay line means for further delaying said signal an amount corresponding to a second number, and means for determining the total delay of said signal by said first and second delay means for resolving the sum of said first and second numbers.

12. The invention set forth in claim 11 wherein said first and second delay means are arranged to delay said signal in predetermined time increments corresponding in number to said first and second numbers, whereby the number of said predetermined increments included in said total delay is equal to the sum of said first and second numbers.

13. The invention set forth in claim 12 wherein said determining means includes a plurality of gating circuits, means for successively conditioning said gating circuits at successive time increments, each of which is equal to one of said predetermined increments, and means for connecting signals taken from said second delay means to all of said gating circuits for effecting a coincidence in one thereof according to the delay of said signal, whereby the sum of said first and second numbers is established according to the identity of the gating circuit in which a coincidence of signals is effected.

14. The invention set forth in claim 13 wherein said gating circuits are conditioned at successive time increments commencing with a time CD following the application of said signal to said first delay means, and said means for connecting signals taken from said second delay means to all of said gating circuits includes means for delaying signals taken from said second delay means by CD prior to connecting them to said gating means when they correspond to a sum less than the radix of the number system being used, and means for delaying signals taken from said second delay means by CD minus said radix when they correspond to a sum equal to or greater than said radix.

15. An adder comprising first means for delaying a signal a plurality of unit time increments equal in number to the sum of two numbers during a first cycle, an output circuit for determining the sum of said two numbers plus a carry from the prior order according to the occurrence of signals entered therein during a second cycle and second means for further delaying the signals taken from said first means by one cycle time plus a unit time increment prior to their entry into said output circuit when there is a carry from the prior order, whereby the sum of said numbers and the carry from the prior order is determined by said output circuit.

16. An adder comprising first means for delaying a signal a plurality of unit time increments equal in number to the sum of two numbers during a first cycle, an output circuit for determining the sum of said two numbers plus a carry from the prior order according to the occurrence of signals entered therein during a second cycle, and second means for further delaying the signals taken from said first means by one cycle time plus a unit time increment prior to their entry into said output circuit when there is a carry from a prior order and the sum of said two numbers plus the carry is less than the radix of the number system being used.

17. An adder comprising first means for delaying a signal a plurality of unit time increments equal in number to the sum of two numbers during a first cycle, an output circuit for determining the sum of said two numbers plus a carry from a prior order according to the occurrence of signals entered therein during a second cycle, and second means for further delaying the signals taken from said first means by one cycle time less a number of time increments equal in number to the radix of the number system being used and plus a unit time increment prior to their entry into said output circuit when there is a carry from the prior order and the sum of said two numbers plus the carry is equal to or greater than said radix.

18. An adder comprising first means for delaying a signal a plurality of time increments equal in number to the sum of two numbers during a first cycle, an output circuit for determining the sum of said two numbers according to the delay of signals entered therein during a second cycle, a second means for further delaying said signals taken from said first means by one cycle time prior to their entry into said output circuit, third means for further delaying signals taken from said first means by one cycle time less a number of time increments corresponding to the radix of the number system being used prior to their entry into said output circuit, and means to selectively entering the signal delayed by one of said second or third means into said output circuit according to whether or not the signal taken from said first means corresponds to a number which is less than said radix.

19. An adder comprising first means for delaying a signal a plurality of time increments equal in number to the sum of two numbers during a first cycle, an output circuit for determining the sum of said two numbers according to the occurrence of signals entered therein during a second cycle, second means for further delaying signals taken from said first means by one cycle time, third means for further delaying signals taken from said first means by one cycle time less a number of time increments corresponding to the radix of the number system being used, fourth means for further delaying signals taken from said first means by one cycle time plus a unit time increment, fifth means for further delaying signals taken from said first means by one cycle time plus a unit time increment minus a number of time increments corresponding to said radix, and means for selectively entering the signal taken from one of said second, third, fourth or fifth means into said output circuit according to the occurrence of signals representative of a carry from a prior order and to the occurrence of the signal representative of the sum of said numbers.

20. The invention set forth in claim 19 wherein said selective entering means includes means responsive to a signal representative of no carry from the previous order and to a signal delayed by said first means a number of time increments less than said radix for connecting said second means to said output circuit.

21. The invention set forth in claim 20 wherein said selective entering means further includes means responsive to a no-carry condition from the previous order and to a signal delayed by said first means a plurality of time increments equal to or greater than said radix for connecting the signal taken from said third means to said output circuit.

22. The invention set forth in claim 21 wherein said selective entering means further includes means responsive to a signal representative of a carry from the next lower order and to a signal delayed by said first means a number of time increments equal in number to at least two less than said radix for connecting said fourth means to said output circuit.

23. The invention set forth in claim 22 wherein said selective entering means further includes means responsive to a signal representative of a carry from a prior order and to a signal delayed by said first means a plurality of time increments equal to or greater than said radix minus one for connecting said fifth means to said output circuit.

24. In combination, delay means, said delay means being selectively variable in predetermined increments for delaying signals entered therein according to control information, means for entering signals in said delay means, means responsive to the entry of a signal in said delay means for generating compare signals at intervals spaced by said predetermined increments, and means responsive to a compare signal occurring when a signal is taken from said delay means for identifying said control information according to said compare signal.

25. In combination, a delay means, said delay means being selectively variable in predetermined increments for delaying signals entered therein according to control information, means for entering signals in said delay means, means responsive to the entry of a signal in said delay means for generating compare signals at intervals spaced by said predetermined increments, a plurality of coincidence circuits, means connecting said compare signals to corresponding coincidence circuits, means for connecting signals taken from said delay means to each of said coincidence circuits, and means responsive to a coincidence in one of said circuits for determining said control information according to said circuit.

26. In combination, a first delay means, a second delay means, means for entering signals into said first and second delay means, said first delay means being selectively variable according to control information, and means responsive to signals taken from said first and second delay means for determining said control information.

27. In combination, a first delay means settable in predetermined increments according to control information for delaying signals entered therein corresponding periods of time, a second delay means for delaying signals entered therein in said predetermined increments for providing periodic compare signals spaced by said predetermined increments, means for entering signals into said first and second delay means, and means responsive to a compare signal taken from said second delay means when a signal is taken from said first delay means for determining said control information according to said compare signal.

28. In combination, a first delay line having a plurality of taps spaced in predetermined increments, a second delay line having a plurality of taps spaced to correspond to the taps of said first delay line, a plurality of coincidence circuits, means connecting each tap of said second line to a corresponding coincidence circuit, means for connecting a selected tap of said first line to each of said coincidence circuits, means for connecting a signal to both of said first and second lines, and means responsive to a coincidence of signals in one of said circuits for identifying said selected tap.

29. A subtracter comprising first and second delay line means for delaying a signal a period of time corresponding to the sum of a first number and a complement of a second number, and means for interpreting said delay period for identifying the difference of said first and second numbers.

30. A subtracter comprising a first delay line means settable according to a first number, a second delay line means settable according to the complement of a second number, and means for determining the sum of the delays afforded by said first and second delay line means for establishing the difference of said numbers.

31. A subtracter comprising first and second delay line means for establishing a delay period representative of the sum of a first number and a complement of a second number, means under control of said delay period for indicating a numerical value corresponding to said sum when said delay period represents a sum which is less than the radix, and means under control of said delay period for indicating a numerical value corresponding to said sum minus the radix when said delay period represents a sum in excess of the radix.

32. In combination, first delay line means for delaying a signal according to a first number, second delay line means for further delaying said signal according to the complement of a second number, the total delay of said signal by said first and second delay means corresponding to the sum of said first number and the complement of said second number, means for determining whether or not said total delay corresponds to a sum which exceeds the radix, and means under control of said determining means for identifying the difference of said first and second numbers according to said total delay.

33. A subtracter comprising first delay line means for delaying a signal according to a first number, second delay line means for further delaying said signal according to the complement of a second number, an output circuit, means for entering said signal taken from said second delay means in said output circuit, said means including means for further delaying said signal taken from said second delay means an amount determined by the total delay of said signal by said first and second delay means, and means for determining the difference of said first and second numbers according to the occurrence of said signal in said output circuit.

34. In combination, first delay line means for delaying a signal according to a first number, second delay line means for further delaying said signal according to a complement of a second number, the total delay of said signal by said first and second delay means corresponding to the sum of said first number and the complement of said second number, means for determining whether or not said total delay corresponds to a sum which exceeds the radix, and means responsive to a total delay corresponding to a sum which exceeds said radix for indicating a difference equal to said sum minus said radix, said means being additionally responsive to a total delay corresponding to a sum which is less than said radix for indicating a difference equal to said sum.

35. The invention set forth in claim 34 with the further provision that said last mentioned means is additionally arranged to indicate a borrow in response to a total delay corresponding to a sum which is less than said radix.

36. A subtractor comprising a first delay line having an input and an output, the delay of said line being settable according to a first number, a second delay line having an input and an output, the delay of said second line being settable according to a complement of a second number, signals taken from the output of said first delay line being connected to the input of said second delay line, means for connecting a signal to the input of said first delay line for passage through said first and second delay lines, said signal being delayed for a total period corresponding to the sum of said first number and the complement of said second number when it is taken from the output of said second delay line, and means under control of said total delay period for determining the difference of said first and second numbers.

37. A subtracter comprising a first delay line having an input and an output, the delay of said line being settable according to a first number, a second delay line having an input and an output, the delay of said second line being settable according to the complement of a second number, signals taken from the output of said first delay line being connected to the input of said second delay line, means for connecting a signal to the input of said first delay line for passage through said first and second delay lines, said signal being delayed for a total period corresponding to the sum of said first number and the complement of said second number when it is taken from the output of said second delay line, and means for determining the difference of said first and second numbers according to said total delay period, said determining means being arranged to indicate a numerical value corresponding to said total delay period when said total delay period corresponds to a numerical value less than the radix and to indicate a numerical value equal to said numerical value corresponding to said total delay period minus the radix, when said total delay period corresponds to a numerical value greater than the radix.

38. A subtracter comprising delay line means for delaying a signal a period of time representative of the sum of a first number and the complement of a second number during a first cycle, an output circuit, means for entering a signal delayed by said delay means in said output circuit after a further delay equal to one cycle time if said period of time is representative of a sum less than the radix, said means being additionally arranged to enter a signal delayed by said delay means in said output circuit after a further delay equal to one cycle time minus an interval corresponding to the radix if said period of time is representative of a sum in excess of the radix, and means for identifying a difference represented by said signal according to the occurrence thereof in said output circuit.

39. A subtracter comprising delay line means for delaying a signal a period of time representative of the sum of a first number and the complement of a second number during a first cycle, means for entering a signal in said delay means, means for generating a borrow signal when said signal is delayed by said delay means a period of time representative of a sum which is less than the radix, an output circuit, a first circuit for connecting said signal taken from said delay means to said output circuit after a further delay equal to one cycle time if said signal has been delayed a period of time representative of a sum which is less than the radix and there is no lower order borrow signal, a second circuit for connecting said signal taken from said delay means to said output circuit after a further delay equal to one cycle time minus an interval representative of a one if said signal has been delayed a period of time representative of a sum which is less than the radix and there is a lower order borrow signal for effecting a borrow, a third circuit for connecting said signal taken from said delay means to said output circuit after a further delay equal to one cycle time minus an interval representative of the radix if said signal has been delayed a period of time representative of a sum in excess of the radix and there is no lower order borrow signal, a fourth circuit for connecting said signal taken from said delay means to said output circuit after a further delay equal to one cycle time minus an interval representative of the radix plus one if said signal has been delayed a period of time representative of a sum in excess of the radix and there is a lower order borrow signal for effecting a borrow, and means for determining the sum represented by said signal according to the occurrence thereof in said output circuit.

40. The invention set forth in the preceding claim wherein said last mentioned means includes a plurality of gating means successively conditioned at succeeding intervals and means for connecting the signal entered in said output circuit to said plurality of gating means, whereby said signal passes through the gating means corresponding to the sum for indicating said sum.

41. Means for combining two numbers according to their sum or difference comprising, a first delay line means settable according to a first number, a second delay line means settable according to a second number, and means for determining the sum of the delays afforded by said first and second means.

References Cited in the file of this patent

UNITED STATES PATENTS

| | | |
|---|---|---|
| 2,611,536 | Barrow | Sept. 23, 1952 |
| 2,653,761 | Lawrence et al. | Sept. 29, 1953 |
| 2,729,811 | Gloess | Jan. 8, 1956 |
| 2,787,416 | Hansen | Apr. 2, 1957 |
| 2,795,378 | Beranger | June 11, 1957 |
| 2,822,131 | Aigrain | Feb. 4, 1958 |
| 2,867,380 | Piel et al. | Jan. 6, 1959 |
| 2,869,786 | Jacobsohn et al. | Jan. 20, 1959 |
| 2,931,572 | Dirks | Apr. 5, 1960 |